(12) United States Patent
Tang

(10) Patent No.: US 8,721,158 B2
(45) Date of Patent: May 13, 2014

(54) LCD DEVICE

(75) Inventor: Guofu Tang, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 153 days.

(21) Appl. No.: 13/509,733

(22) PCT Filed: Apr. 27, 2012

(86) PCT No.: PCT/CN2012/074818
§ 371 (c)(1),
(2), (4) Date: May 14, 2012

(87) PCT Pub. No.: WO2013/131313
PCT Pub. Date: Sep. 12, 2013

(65) Prior Publication Data
US 2013/0235612 A1    Sep. 12, 2013

(30) Foreign Application Priority Data

Mar. 9, 2012  (CN) .......................... 2012 1 0061727

(51) Int. Cl.
*F21V 21/00*    (2006.01)
*F21V 7/00*    (2006.01)

(52) U.S. Cl.
USPC .......................... 362/633; 362/97.2; 362/561

(58) Field of Classification Search
USPC ........................................ 362/97.2, 561, 633
See application file for complete search history.

(56) References Cited

U.S. PATENT DOCUMENTS

| | | | |
|---|---|---|---|
| 6,650,381 B2 * | 11/2003 | Liao | 349/58 |
| 2005/0099806 A1 * | 5/2005 | Tsai | 362/218 |
| 2006/0120034 A1 * | 6/2006 | Huang | 361/687 |
| 2007/0081109 A1 | 4/2007 | Igarashi | |
| 2009/0225252 A1 * | 9/2009 | Jeong | 349/58 |

FOREIGN PATENT DOCUMENTS

| | | |
|---|---|---|
| CN | 101470298 A | 7/2009 |
| CN | 201322255 Y | 10/2009 |
| CN | 201608812 U | 10/2010 |
| CN | 101975361 A | 2/2011 |
| JP | 2008165101 A | 7/2008 |
| JP | 2008299182 A | 12/2008 |

OTHER PUBLICATIONS

Wu Riwen, the International Searching Authority written comments, Dec. 2012, CN.

* cited by examiner

*Primary Examiner* — Stephen F Husar
*Assistant Examiner* — James Cranson, Jr.
(74) *Attorney, Agent, or Firm* — IPro, Inc.; Na Xu

(57) ABSTRACT

The invention provides an LCD device. The LCD device includes a frame. The frame is internally provided with a lightbar, an LGP, and a reflecting surface. A long and narrow reflecting cavity is formed between the lightbar, the reflecting surface, and the LGP, and the frame is provided with heat dissipating holes which are communicated with the outside of the LCD device in the corresponding positions of both ends of the reflecting cavity. In the invention, the frame at the open parts of both ends of the reflecting cavity is provided with heat dissipating holes, thereby forming a "chimney effect", namely hot air rapidly rises and then is discharged from the top holes, and cold air is rapidly supplemented from the bottom holes. Thus, heat convection is accelerated, thereby improving heat dissipation effect.

11 Claims, 5 Drawing Sheets

LCD DEVICE

TECHNICAL FIELD

The invention relates to the field of liquid crystal displays (LCDs), and more particularly to an LCD device.

BACKGROUND

In a backlight module, light emitting diodes (LEDs) employ a reflection-light mode. A reflecting cavity is formed between Printed Circuit Board (PCB) surface of LEDs, reflecting surface, and a light guide panel (LGP). As shown in FIG. 1, light emitted by LEDs is reflected into the LGP via the reflecting surface, and light is fully mixed after passing through the reflecting cavity, thereby decreasing the phenomenon of hot spots. The reflecting surface can be arranged on a middle frame, or formed by bending a backplane. Because the inner structure of the backlight module is compact, heat is mainly dissipated by heat conduction, and the PCB of an LED lightbar is flatly stuck on the backplane, thereby enlarging contact surface for conducting heat away. Because the reflecting cavity is enclosed in a compact structure, the heat flow of air cannot be conducted, thus it is difficult to form effective heat convection.

SUMMARY

In view of the above-described problems, the aim of the invention is to provide an LCD device with good heat dissipation effect.

The aim of the invention is achieved by the following technical scheme.

An LCD device comprises a frame. The frame is internally provided with a lightbar, an LGP, and a reflecting surface. A long and narrow reflecting cavity is formed between the reflecting surface of the lightbar and the LGP, and the frame is provided with heat dissipating holes which are communicated with the outside of the LCD device in the corresponding positions of both ends of the reflecting cavity.

Preferably, the LCD device comprises an upper side, a lower side, a left side, and a right side. The lightbar is arranged on both the left side and the right side, or either of the two sides. The LCD device is vertically placed generally, and then both the left and right sides of the LCD device are vertically placed. The lightbar is arranged on the two sides, and thus a natural "chimney" is formed by the heat dissipating holes and the reflecting cavity, thereby improving heat dissipation effect.

Preferably, either end of the reflecting cavity is provided with at least two heat dissipating holes. Heat dissipation effect is guaranteed and the hole diameter of individual heat dissipating hole is dwindled by providing a plurality of heat dissipating holes. Thus, dust of large particles is prevented from entering the device, and the degree of protection of the device is increased.

Preferably, the heat dissipating holes are in a shape of round, polygon, trapezoid, or a mixture thereof. This is the shape of the heat dissipating holes, which are determined according to specific processing conditions and the aesthetics of integrated design.

Preferably, the frame comprises a front frame, a middle frame, and a backplane. The heat dissipating holes are arranged in the front frame, the middle frame, the backplane, or any combination thereof. This is a specific form of the frame. The heat dissipating holes can be arranged on different frames according to different frame structures of the LCD device.

Preferably, the frame comprises a backplane. The lightbar is fixed on the backplane. The backplane is provided with air ducts at the bottom for fixing the lightbar, and is provided with heat dissipating holes communicated with the air ducts in the end positions of both ends of the lightbar opposite to the LCD panel of the LCD device. Because the heat dissipating holes face the LCD panel and are hidden inside the LCD device, the degree of protection is high. Specifically, for LCD devices of which corresponding lightbars are positioned on both the left and right sides, foreign material on the top of two sides of the LCD cannot enter the inside of the device through the heat dissipating holes.

Preferably, the frame comprises a front frame and a backplane; the heat dissipating holes are formed by surrounding the front frame and the backplane.

Preferably, the frame comprises a middle frame and a backplane; the heat dissipating holes are formed by surrounding the middle frame and the backplane.

Preferably, the frame is stuck with a waterproof breathable film in the position corresponding to the heat dissipating holes. The waterproof breathable film can prevent water and dust from entering the LCD device, thereby increasing the degree of protection of the device, and the waterproof breathable film can reflect the light inside the reflecting cavity, and prevent light leakage.

Preferably, the waterproof breathable film is white which is difficult to absorb light, thereby further improving reflection effect, and increasing light utilization rate.

The inventor finds that a reflecting cavity is formed between the lightbar, the reflecting surface, and the LGP, most chips of the LEDs are radiated by the LED surface for the LCD which employs the LEDs as the lightbar, and thus, the air temperature of the reflecting cavity is increased. The backlight module is vertically used in general. In the invention, the frame at the open parts of both ends of the reflecting cavity is provided with heat dissipating holes, thereby forming a "chimney effect", namely hot air rapidly rises and then is discharged from the top holes, and cold air is rapidly supplemented from the bottom holes. Thus, heat convection is accelerated, thereby improving heat dissipation effect.

Legends: 100. reflecting surface; 200. frame; 210. middle frame; 220. backplane; 300. lightbar; 400. reflecting cavity; 500. LGP; 600. heat dissipating hole.

DETAILED DESCRIPTION

The invention will further be described in detail in accordance with the figures and the preferable examples.

Figure 1:
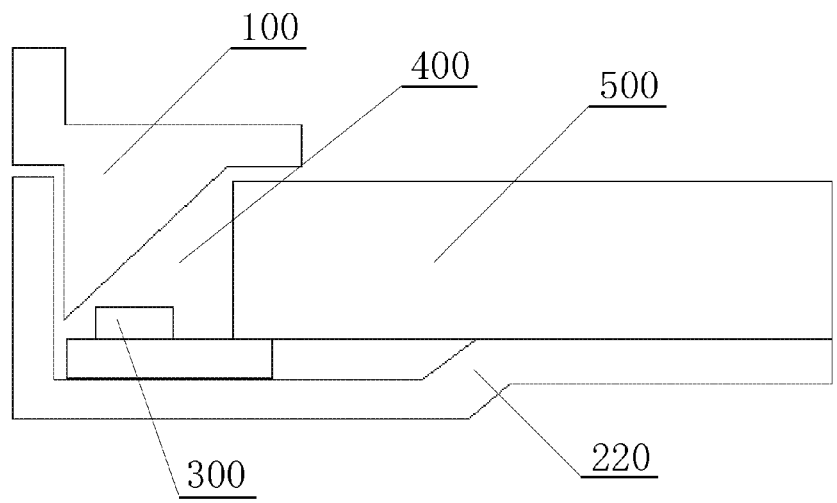
FIG. 1 is a schematic diagram of a reflecting cavity of an LCD device.
Figure 2:
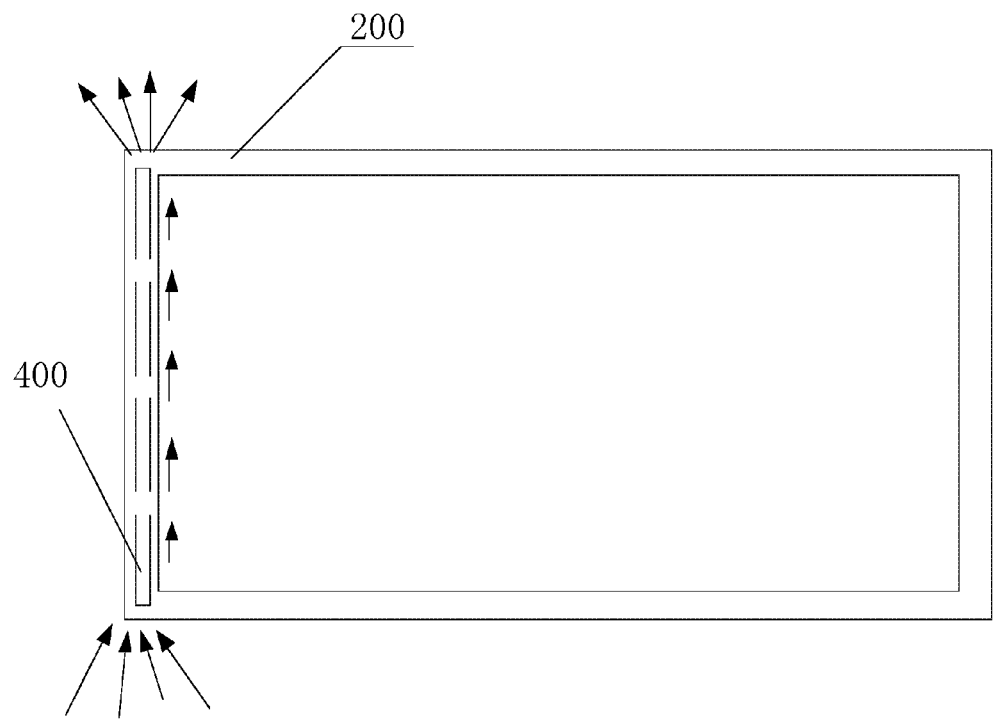
FIG. 2 is a schematic diagram of the invention.

An LCD device comprises a frame 200. The frame 200 is internally provided with a lightbar 300, an LGP 500, and a reflecting surface 100. A long and narrow reflecting cavity 400 is formed between the lightbar 300, the reflecting surface 100, and the LGP 500. The frame 200 is provided with heat dissipating holes 600 which are communicated with the outside of the LCD device in the corresponding positions of both ends of the reflecting cavity 400. The LCD device comprises an upper side, a lower side, a left side, and a right side; the lightbar 300 is arranged on both the left side and the right side or either of the two sides. The left side and the right side of the LCD device are vertically placed in general. Thus, the heat dissipating holes 600 and the reflecting cavity 400 can form a natural "chimney" (as shown in FIG. 2), thereby improving heat dissipation effect.

Figure 3:
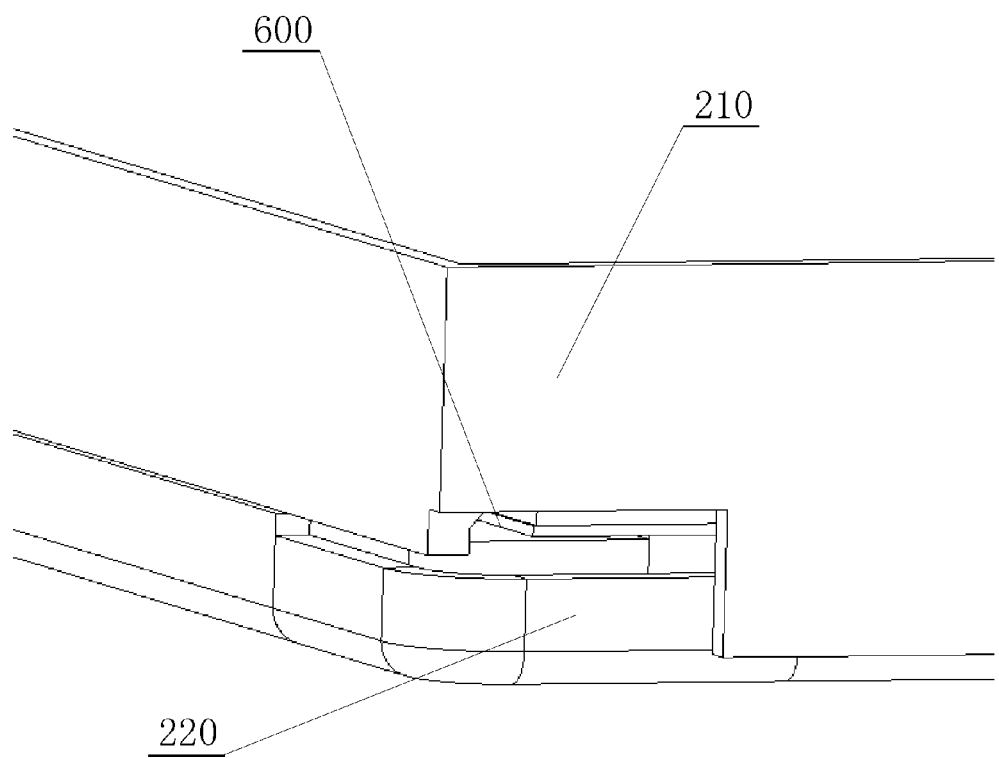
FIG. 3 is a schematic diagram of a heat dissipating hole formed by surrounding different frames of the invention.

The frame 200 comprises a front frame, a middle frame 210, and a backplane 220. The heat dissipating holes 600 can be arranged in different frames 200 according to different structures of the frame 200 of the LCD device. The heat dissipating holes 600 can be formed by surrounding different frames 200 such as the front frame and the backplane 220, or the middle frame 210 and the backplane 220. FIG. 3 shows a heat dissipating hole 600 formed by surrounding a middle frame 210 and a backplane 220.

Figure 4:
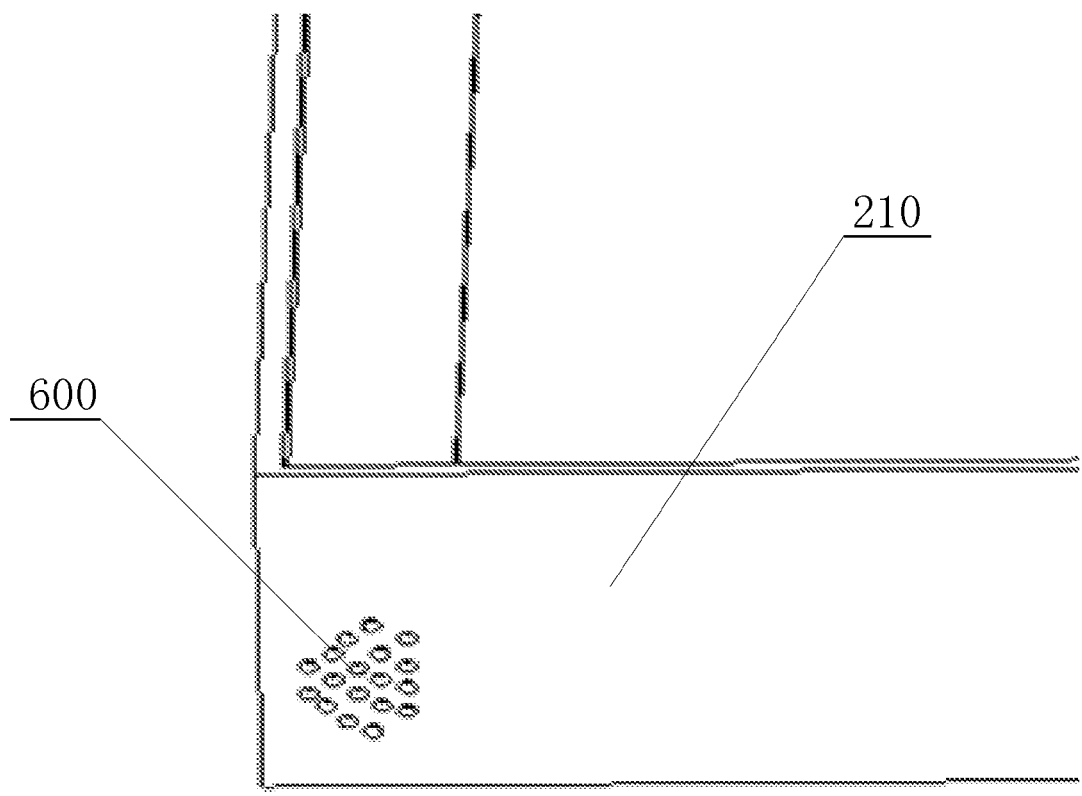
FIG. 4 is a schematic diagram of a plurality of heat dissipating holes of the invention.
Figure 5:
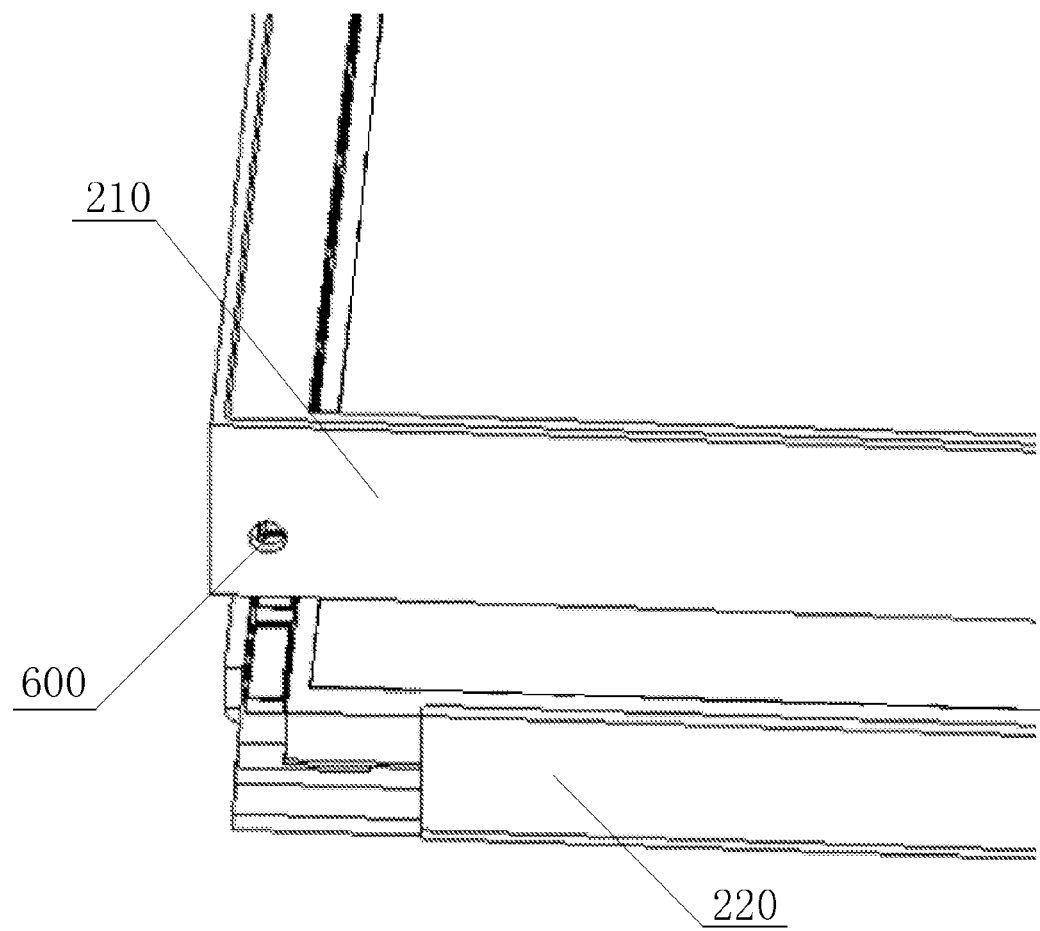
FIG. 5 is a schematic diagram of a heat dissipating hole arranged in a middle frame of the invention.

Furthermore, as shown in FIG. 4, either end of the reflecting cavity 400 is provided with at least two heat dissipating holes 600. Optionally, as shown in FIG. 5, each end is only provided with one heat dissipating hole 600. Heat dissipation effect is guaranteed and the hole diameter of individual heat dissipating hole 600 is dwindled by providing a plurality of heat dissipating holes 600. Thus, dust of large particles is prevented from entering the device, and the degree of protection of the device is increased. The shape of the heat dissipating holes 600 can be various such as round, polygon, trapezoid, etc., and which are determined according to specific processing conditions and the aesthetics of integrated design.

Furthermore, the frame 200 is stuck with a waterproof breathable film in the position corresponding to the heat dissipating holes 600. The waterproof breathable film can prevent water and dust from entering the LCD device, thereby increasing the degree of protection of the device, and the waterproof breathable film can reflect the light inside the reflecting cavity 400, and prevent light leakage.

Figure 6:
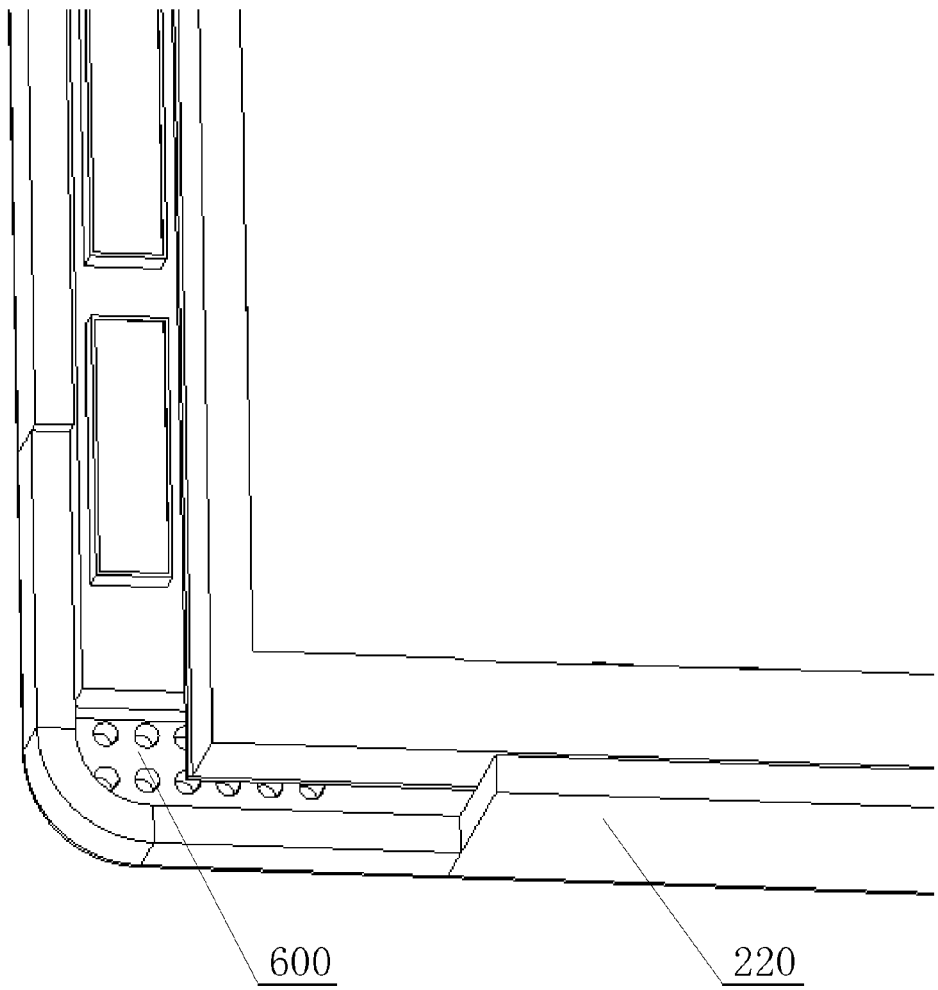
FIG. 6 is a schematic diagram of heat dissipating holes arranged in a backplane of the invention.

FIG. 6 shows another mode of arranging heat dissipating holes 600. The lightbar is fixed on the backplane 220, and the backplane 220 is provided with air ducts at the bottom for fixing the lightbar 300, and is provided with heat dissipating holes 600 which are communicated with the air ducts in the end positions of both ends of the lightbar 300 opposite to the LCD panel of the LCD device. Because the heat dissipating holes 600 face the LCD panel and are hidden inside the LCD device, the degree of protection is high. Specifically, for LCD devices of which the corresponding lightbars 300 are positioned on both the left and right sides, foreign material on the top of both sides of the LCD cannot enter the inside of the device through the heat dissipating holes 600.

The invention is described in detail in accordance with the above contents with the specific preferred examples. However, this invention is not limited to the specific examples. For the ordinary technical personnel of the technical field of the invention, on the premise of keeping the conception of the invention, the technical personnel can also make simple deductions or replacements, and all of which should be considered to belong to the protection scope of the invention.

I claim:

1. An LCD device, comprising: a frame; wherein said frame is internally provided with a lightbar, an LGP, and a reflecting surface; a long and narrow reflecting cavity is formed between said lightbar, said reflecting surface, and said LGP, and said frame is provided with heat dissipating holes which are communicated with the outside of said LCD device in the corresponding positions of both ends of said reflecting cavity; said LCD device comprises an upper side, a lower side, a left side, and a right side; said lightbar is arranged on both said left side and said right side or either of the two sides; either end of said reflecting cavity is provided with at least two heat dissipating holes; said heat dissipating holes are in a shape of round, polygon, trapezoid, or a combination thereof; said lightbar is fixed on a backplane, and said backplane is provided with air ducts at the bottom for fixing said lightbar, and further provided with heat dissipating holes which are communicated with said air ducts in the end positions of both ends of said lightbar opposite to an LCD panel of said LCD device; and said frame is stuck with a waterproof breathable film in the position corresponding to said heat dissipating holes.

2. An LCD device, comprising: a frame; wherein said frame is internally provided with a lightbar, an LGP, and a reflecting surface; a long and narrow reflecting cavity is formed between said lightbar, said reflecting surface, and said LGP, and said frame is provided with heat dissipating holes which are communicated with the outside of said LCD device in the corresponding positions of both ends of said reflecting cavity.

3. The LCD device of claim 2, wherein said LCD device comprises an upper side, a lower side, a left side, and a right side; and said lightbar is arranged on both said left side and said right side or either of the two sides.

4. The LCD device of claim 2, wherein either end of said reflecting cavity is provided with at least two heat dissipating holes.

5. The LCD device of claim 2, wherein said heat dissipating holes are in a shape of round, polygon, trapezoid, or a combination thereof.

6. The LCD device of claim 2, wherein said frame comprises a front frame, a middle frame, and a backplane; and said heat dissipating holes are arranged in said front frame, said middle frame, said backplane, or any combination thereof.

7. The LCD device of claim 2, wherein said frame comprises a backplane; said lightbar is fixed on said backplane, and said backplane is provided with air ducts at the bottom for fixing said lightbar, and further provided with heat dissipating holes which are communicated with said air ducts in the end positions of both ends of said lightbar opposite to an LCD panel of said LCD device.

8. The LCD device of claim 2, wherein said frame comprises a front frame and a backplane; and said heat dissipating holes are formed by surrounding said front frame and said backplane.

9. The LCD device of claim 2, wherein said frame comprises a middle frame and a backplane; and said heat dissipating holes are formed by surrounding said middle frame and said backplane.

10. The LCD device of claim 2, wherein said frame is stuck with a waterproof breathable film in the position corresponding to said heat dissipating holes.

11. The LCD device of claim 10, wherein said waterproof breathable film is white.

* * * * *